(12) United States Patent
Cheng et al.

(10) Patent No.: US 9,865,049 B2
(45) Date of Patent: Jan. 9, 2018

(54) METHODS AND SYSTEMS FOR BACKGROUND SUBTRACTION IN AN IMAGE

(71) Applicant: LIFE TECHNOLOGIES CORPORATION, Carlsbad, CA (US)

(72) Inventors: Francis T. Cheng, Palo Alto, CA (US); Thomas Wessel, Pleasanton, CA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 34 days.

(21) Appl. No.: 14/347,960

(22) PCT Filed: Sep. 28, 2012

(86) PCT No.: PCT/US2012/057710
§ 371 (c)(1),
(2) Date: Mar. 27, 2014

(87) PCT Pub. No.: WO2013/049440
PCT Pub. Date: Apr. 4, 2013

(65) Prior Publication Data
US 2014/0233816 A1 Aug. 21, 2014

Related U.S. Application Data

(60) Provisional application No. 61/660,343, filed on Jun. 15, 2012, provisional application No. 61/541,453, (Continued)

(51) Int. Cl.
*G06K 9/00* (2006.01)
*G06T 7/00* (2017.01)
(Continued)

(52) U.S. Cl.
CPC .............. *G06T 7/0012* (2013.01); *G06T 5/50* (2013.01); *G06T 7/70* (2017.01);
(Continued)

(58) Field of Classification Search
None
See application file for complete search history.

(56) References Cited

U.S. PATENT DOCUMENTS

| 2005/0043606 A1 | 2/2005 | Pewzner |
| 2005/0226780 A1 | 10/2005 | Sandell et al. |

(Continued)

FOREIGN PATENT DOCUMENTS

| CN | 101874206 | 10/2010 |
| EP | 1422661 | 5/2004 |
| WO | 2003/034064 | 4/2003 |

OTHER PUBLICATIONS

International Search Report and Written Opinion of the ISA for Int'l Appl. No. PCT/US2012/058197 dated Dec. 21, 2012.

(Continued)

*Primary Examiner* — Atiba O Fitzpatrick
(74) *Attorney, Agent, or Firm* — Matthew Chen

(57) ABSTRACT

A method for improving image quality is provided. The method includes receiving image data of a substrate, wherein the image data is generated by imaging the substrate, and an image is generated from the image data. The method further includes generating a background representation from a background noise portion of the image, wherein the background portion includes signal information undesired for further processing and generating a background subtracted image by subtracting the background representation from the image. In this way, a separate background image is not needed to subtract the background from the image including the regions-of-interest to improve image quality.

17 Claims, 23 Drawing Sheets

Related U.S. Application Data filed on Sep. 30, 2011, provisional application No. 61/541,515, filed on Sep. 30, 2011.

(51) Int. Cl.
  G06T 5/50 (2006.01)
  G06T 7/70 (2017.01)

(52) U.S. Cl.
  CPC ............ *G06T 2207/20068* (2013.01); *G06T 2207/30024* (2013.01); *G06T 2207/30072* (2013.01)

(56) References Cited

U.S. PATENT DOCUMENTS

| | | | |
|---|---|---|---|
| 2005/0244040 A1* | 11/2005 | Li | G06K 9/3216 382/128 |
| 2006/0036373 A1 | 2/2006 | Ghosh | |
| 2006/0088928 A1 | 4/2006 | Sweet et al. | |
| 2007/0111301 A1 | 5/2007 | Fujita et al. | |
| 2010/0142848 A1 | 6/2010 | Kolterman et al. | |

OTHER PUBLICATIONS

Bowman, C. et al., "Automated Analysis of Gene-Microarray Images", *Proceedings of the 2002 IEEE Canadian Conference on Electrical and Computer Engineering*, May 2002, 1140-1144.

Gonzales, Rafael C. et al., "Digital Image Processing: Image Enhancement in the Spatial Domain", *Digital Image Processing*, Prentice-Hall, Chapter 3, 2002, 85-102.

International Search Report and Written Opinion for International Appl. No. PCT/US2012/057710 mailed Mar. 11, 2013.

Pisano, Etta D. et al., "Image Processing Algorithms for Digital Mammography: A Pictorial Essay", *Imaging & Therapeutic Technology*, vol. 20, No. 5, 2000, 1479-1491.

Stoel, B. C. et al., "Interactive Histogram Equalization", *Pattern Recognition Letters*, vol. 11, No. 4, 1990, 247-254.

Uehara, Christian et al., "Towards Automatic Analysis of DNA Microarrays", *Proceedings of the Sixth IEEE Workshop on Applications of Computer Vision*, Dec. 2002, 1-6.

Wang, Xujing et al., "A Novel Approach for High-Quality Microarray Processing Using Third-Dye Array Visualization Technology", *IEEE Transactions on Nanobioscience*, vol. 2, No. 4, 2003, 193-201.

\* cited by examiner

METHODS AND SYSTEMS FOR BACKGROUND SUBTRACTION IN AN IMAGE

CROSS-REFERENCE TO RELATED APPLICATIONS

This application claims the benefit of priority of U.S. provisional application Ser. No. 61/541,453, filed on Sep. 30, 2011, U.S. provisional application Ser. No. 61/541,515, filed Sep. 30, 2011, and U.S. provisional application Ser. No 61/660,343, filed Jun. 15, 2012, all of which are incorporated herein by reference in their entireties.

BACKGROUND

Optical systems for biological and biochemical reactions have been used to monitor, measure, and/or analyze such reactions in real time. Such systems are commonly used in sequencing, genotyping, polymerase chain reaction (PCR), and other biochemical reactions to monitor the progress and provide quantitative data. For example, an optical excitation beam may be used in real-time PCR (qPCR) reactions to illuminate hybridization probes or molecular beacons to provide fluorescent signals indicative of the amount of a target gene or other nucleotide sequence. Increasing demands to provide greater numbers of reactions per test or experiment have resulted in instruments that are able to conduct ever higher numbers of reactions simultaneously.

The increase in the number sample sites in a test or experiment has led to microtiter plates and other sample formats that provide ever smaller sample volumes. In addition, techniques such as digital PCR (dPCR) have increased the demand for smaller sample volumes that contain either zero or some positive number (e.g., 1, 2, 3, etc) of target nucleotide sequence in all test samples.

Furthermore, generally, there is an increasing need to automate systems to increase efficiency. For example, advances in automated biological sample processing instruments allow for quicker, more efficient, and high throughput analysis of samples. These types of systems may assay a greater number of samples than previous systems. As such, samples undergoing various assays are labeled or marked with identifiers.

Previously, an operator of the system or instrument may have had to manually track and validate samples by reading the identifiers on sample containers, racks, or assay chips. This type of manual tracking and validation can be labor-intensive and include a high probability of operator error such as sample mistracking, or improper testing. Furthermore, the greater number of samples desired to be assayed would be more time intensive and cumbersome.

Other more automated systems may scan for identifiers to track and validate samples before testing. However, these systems often need additional components. Furthermore, the identifiers may be misread or unreadable by the systems.

As such, with higher throughput systems performing detection and analysis on a large number of samples of small volumes" as the cumulative effect of system background noise becomes increasingly important as the volumes get smaller, it becomes increasingly important to remove background noise due to undesired emissions or physical artifacts in the system to be able to perform an accurate analysis.

Previously, images have been processed by first imaging a background substrate to generate data that can then be used to subtract from the image data generated by imaging a substrates including the region-of-interests.

SUMMARY

In one exemplary embodiment, a method for improving image quality is provided. The method includes receiving image data of a substrate, wherein the image data is generated by imaging the substrate, and an image is generated from the image data. The method further includes generating a background representation from a background noise portion of the image, wherein the background portion includes signal information undesired for further processing and generating a background subtracted image by subtracting the background representation from the image. In this way, a separate background image is not needed to subtract the background from the image including the regions-of-interest to improve image quality.

DETAILED DESCRIPTION

Figure 1:
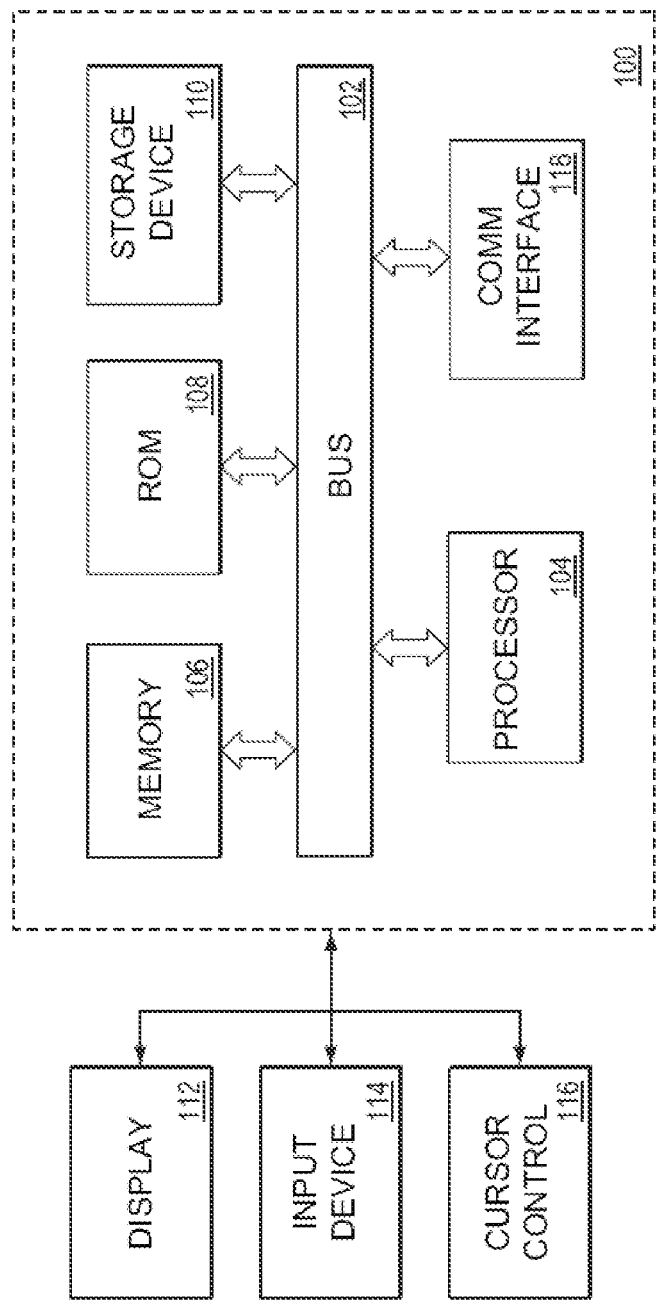
FIG. 1 is a block diagram that illustrates a computer system, upon which embodiments of the present teachings may be implemented.

Exemplary systems for methods related to the various embodiments described in this document include those described in U.S. Provisional Patent Application No. 61/541,453, U.S. Provisional Patent Application No. 61/541,515, U.S. Provisional Patent Application No. 61/541,342, U.S. Provisional Patent Application No. 29/403,049, U.S. Provisional Patent Application No. 61/541,495, U.S. Provisional Patent Application No. 61/541,366, and U.S. Provisional Patent Application No. 61/541,371, all of which are filed Sep. 30, 2011, and all of which are also incorporated herein in their entirety by reference. Exemplary systems for methods related to the various embodiments described in this document include those described in U.S. Provisional Patent Application No. 61/660,569 and U.S. Provisional Patent Application No. 61/660,343, both filed Jun. 15, 2012, and both of which are also incorporated herein in their entireties by reference.

To provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

According to various embodiments described herein, determining a point of reference in a sample substrate in an automated system is provided. In particular, a point of reference of a substrate within an image taken by the automated system in determined. In sample substrates, generally, there are no fiduciary landmarks, as in semiconductor fabrication. Furthermore, when imaging a substrate with a plurality of reaction sites, there may be a considerable amount of optical scatter noise and optical non-uniformity. Various embodiments according to the present teachings may determine a point of reference in spite of these obstacles.

To perform other algorithms, such as machine reading portions of an image to identify, for example, a substrate, a system may need to have a landmark location on the substrate to begin processing.

Furthermore, according to various embodiments, a substrate may be detected in an automated system. The proper installation or positioning of a substrate may be determined along with the width of the substrate.

As such, according to various embodiments, a substrate, including a plurality of reaction sites, may be detected and a point of reference may be determined. In one example, a plurality of reaction sites may be grouped into subarrays on a metal substrate. In the same example, larger portions of metal may separate adjacent subarrays. A substrate used in an automated system will have a known geometry and dimensions. The geometry and dimensions may be stored in a memory of the system.

Further, according to various embodiments, fast image processing methods and system for determining a point of reference of a substrate in an image is provided. Additionally, embodiments described herein may be implemented in light of global optical distortion patterns.

In some cases, the calibration methods described above may be sufficient to perform the desired analysis with the biological instrument. In other cases, more methods may be used to obtain data that will better indicate locations of reaction sites and remove distortions and other unwanted background noise in the detected emission data. Some background noise in the data may be due to physical sources on the substrate, and cases holding the substrate in the instrument, such as dust particles or scratches, for example. Other background noise in the data may be due to natural radiation from the surfaces in the instrument, such as reflection and natural fluorescence. Other background noise may also be a result from the optical system detecting the emission data or the light source, for example. A representation of background noise may be referred to as a pedestal, or as background, or as a baseline offset, according to embodiments of the invention. A background is determined from run data, calibration data, or data obtained during instrument operation, for example.

The biological system may be detecting several hundred to several thousand samples, all of which may be a very small volume, such as less than one nanoliter. As such, other background noise removal methods may be used alone or in combination with the calibration methods described in this document according to various embodiments to be able to determine and analyze the emission data from the sample volumes. In some embodiments, the location of samples volumes may be more accurately determined within the substrate to perform a more accurate analysis. For example, in some instances, such as digital PCR analysis, being able to more accurately distinguish reactions in sample volumes versus non-reactions may produce more accurate results. Even further, according to various embodiments described herein, empty reaction sites empty may be distinguished from sample volumes in reaction sites that did not react, which may also be distinguished from sample volumes in wells or through-holes that did react. According to various embodiments of the present teachings, reaction sites may be wells, spots, indentations, or through-holes, for example.

According to various embodiments described herein, background noise removal may include image data analysis and processing. The method may include analyzing intensity values of the image data to interpolate the background noise that may be removed from the image of the substrate including the sample volumes. In this way, locations of the sample volumes within the image may also be determined.

Computer-Implemented System

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on non-transitory computer-readable media. Some other processes can be implemented using analog circuitry, as is well known to one of ordinary skill in the art. Additionally, memory or other storage, as well as communication components, may be employed in embodiments of the invention.

FIG. 1 is a block diagram that illustrates a computer system 100 that may be employed to carry out processing functionality, according to various embodiments. Instruments to perform experiments may be connected to the exemplary computing system 100. According to various embodiments, the instruments that may be utilized are a thermal cycler system 200 of FIG. 2 or a thermal cycler system 300 of FIG. 3 may utilize. Computing system 100 can include one or more processors, such as a processor 104. Processor 104 can be implemented using a general or special purpose processing engine such as, for example, a microprocessor, controller or other control logic. In this example, processor 104 is connected to a bus 102 or other communication medium.

Further, it should be appreciated that a computing system 100 of FIG. 1 may be embodied in any of a number of forms, such as a rack-mounted computer, mainframe, supercomputer, server, client, a desktop computer, a laptop computer, a tablet computer, hand-held computing device (e.g., PDA, cell phone, smart phone, palmtop, etc.), cluster grid, netbook, embedded systems, or any other type of special or general purpose computing device as may be desirable or appropriate for a given application or environment. Additionally, a computing system 100 can include a conventional network system including a client/server environment and one or more database servers, or integration with LIS/LIMS infrastructure. A number of conventional network systems, including a local area network (LAN) or a wide area network (WAN), and including wireless and/or wired components, are known in the art. Additionally, client/server environments, database servers, and networks are well documented in the art. According to various embodiments described herein, computing system 200 may be configured to connect to one or more servers in a distributed network. Computing system 200 may receive information or updates from the distributed network. Computing system 200 may also transmit information to be stored within the distributed network that may be accessed by other clients connected to the distributed network.

Computing system 100 may include bus 102 or other communication mechanism for communicating information, and processor 104 coupled with bus 102 for processing information.

Computing system 100 also includes a memory 106, which can be a random access memory (RAM) or other dynamic memory, coupled to bus 102 for storing instructions to be executed by processor 104. Memory 106 also may be used for storing temporary variables or other intermediate information during execution of instructions to be executed by processor 104. Computing system 100 further includes a read only memory (ROM) 108 or other static storage device coupled to bus 102 for storing static information and instructions for processor 104.

Computing system 100 may also include a storage device 110, such as a magnetic disk, optical disk, or solid state drive (SSD) is provided and coupled to bus 102 for storing information and instructions. Storage device 110 may include a media drive and a removable storage interface. A media drive may include a drive or other mechanism to support fixed or removable storage media, such as a hard disk drive, a floppy disk drive, a magnetic tape drive, an optical disk drive, a CD or DVD drive (R or RW), flash drive, or other removable or fixed media drive. As these examples illustrate, the storage media may include a computer-readable storage medium having stored therein particular computer software, instructions, or data.

In alternative embodiments, storage device 110 may include other similar instrumentalities for allowing computer programs or other instructions or data to be loaded into computing system 100. Such instrumentalities may include, for example, a removable storage unit and an interface, such as a program cartridge and cartridge interface, a removable memory (for example, a flash memory or other removable memory module) and memory slot, and other removable storage units and interfaces that allow software and data to be transferred from the storage device 110 to computing system 100.

Computing system 100 can also include a communications interface 118. Communications interface 118 can be used to allow software and data to be transferred between computing system 100 and external devices. Examples of communications interface 118 can include a modem, a network interface (such as an Ethernet or other NIC card), a communications port (such as for example, a USB port, a RS-232C serial port), a PCMCIA slot and card, Bluetooth, etc. Software and data transferred via communications interface 118 are in the form of signals which can be electronic, electromagnetic, optical or other signals capable of being received by communications interface 118. These signals may be transmitted and received by communications interface 118 via a channel such as a wireless medium, wire or cable, fiber optics, or other communications medium. Some examples of a channel include a phone line, a cellular phone link, an RF link, a network interface, a local or wide area network, and other communications channels.

Computing system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104, for example. An input device may also be a display, such as an LCD display, configured with touch screen input capabilities. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A computing system 100 provides data processing and provides a level of confidence for such data. Consistent with certain implementations of embodiments of the present teachings, data processing and confidence values are provided by computing system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process states described herein. Alternatively hard-wired circuitry may be used in place of or in combination with software instructions to implement embodiments of the present teachings. Thus implementations of embodiments of the present teachings are not limited to any specific combination of hardware circuitry and software.

The term "computer-readable medium" and "computer program product" as used herein generally refers to any media that is involved in providing one or more sequences or one or more instructions to processor 104 for execution. Such instructions, generally referred to as "computer program code" (which may be grouped in the form of computer programs or other groupings), when executed, enable the computing system 100 to perform features or functions of embodiments of the present invention. These and other forms of non-transitory computer-readable media may take many forms, including but not limited to, non-volatile media, and volatile media. Non-volatile media includes, for example, solid state, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on magnetic disk of a remote computer. The remote computer can load the instructions into its dynamic memory and send the instructions over a telephone line using a modem. A modem local to computing system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

PCR Instruments

Figure 2:
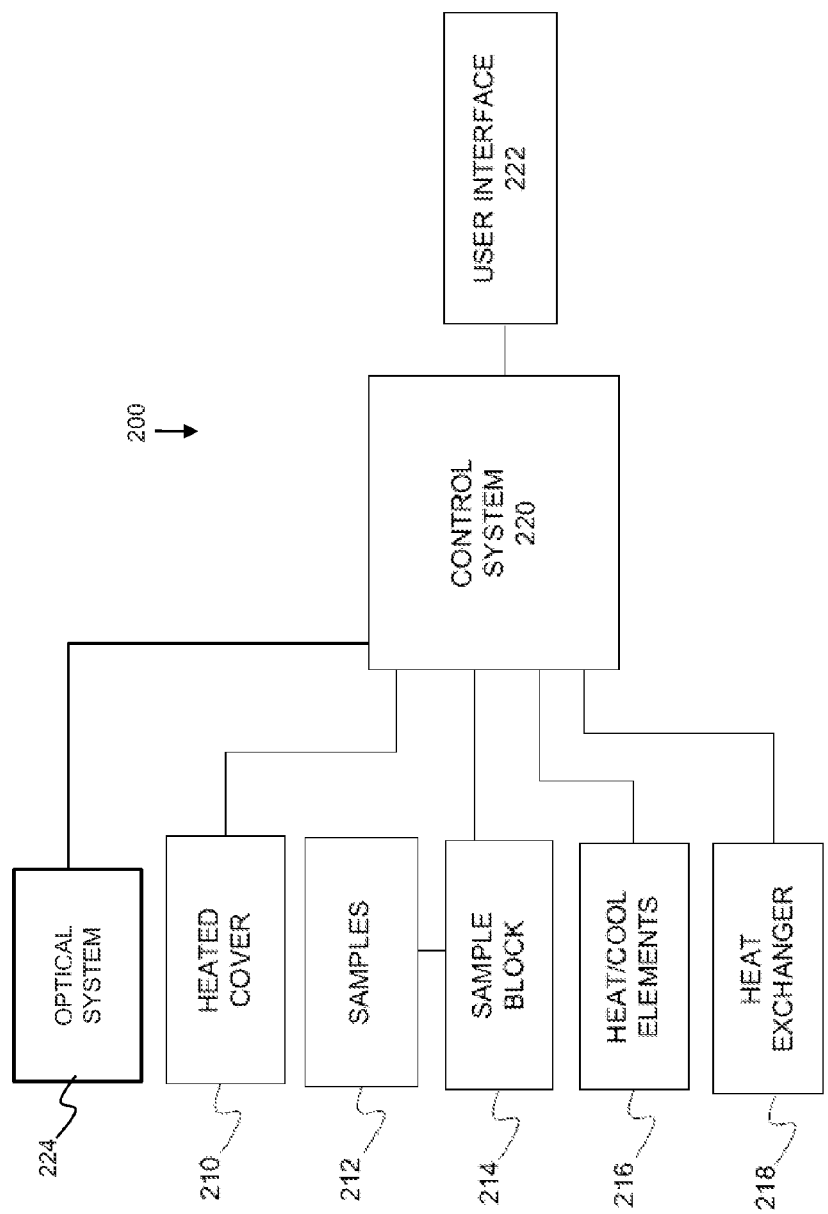
FIG. 2 is a block diagram that illustrates a polymerase chain reaction (PCR) instrument, upon which embodiments of the present teachings may be implemented.

As mentioned above, an instrument that may be utilized according to various embodiments, but is not limited to, is a polymerase chain reaction (PCR) instrument. FIG. 2 is a block diagram that illustrates a PCR instrument 200, upon which embodiments of the present teachings may be implemented. PCR instrument 200 may include a heated cover 210 that is placed over a plurality of samples 212 contained in a sample support device (not shown). In various embodiments, a sample support device may be a glass or plastic slide with a plurality of reaction sites, which reaction sites have a cover between the reaction sites and heated cover 210. Some examples of a sample support device may include, but are not limited to, a multi-well plate, such as a standard microtiter 96-well, a 384-well plate, or a microcard, or a substantially planar support, such as a glass or plastic slide. The reaction sites in various embodiments of a sample support device may include depressions, indentations, ridges, and combinations thereof, patterned in regular or irregular arrays formed on the surface of the substrate. Reaction sites may also be referred to as regions-of-interest. Various embodiments of PCR instruments include a sample block 214, elements for heating and cooling 216, a heat exchanger 218, control system 220, and user interface 222. Various embodiments of a thermal block assembly according to the present teachings comprise components 214-218 of PCR instrument 200 of FIG. 2.

Real-time PCR instrument 200 has an optical system 224. In FIG. 2, an optical system 224 may have an illumination source (not shown) that emits electromagnetic energy, an optical sensor, detector, or imager (not shown), for receiving electromagnetic energy from samples 212 in a sample support device, and optics 240 used to guide the electromagnetic energy from each DNA sample to the imager. Optical system 224 may be a CCD camera or a fluorescent camera, according to various embodiments.

For embodiments of PCR instrument 200 in FIG. 2, control system 220, may be used to control the functions of the detection system, heated cover, and thermal block assembly. Control system 220 may be accessible to an end user through user interface 222 of PCR instrument 200 in FIG. 2. Also a computer system 100, as depicted in FIG. 1, may serve as to provide the control the function of PCR instrument 200 in FIG. 2, as well as the user interface function. Additionally, computer system 100 of FIG. 1 may provide data processing, display and report preparation functions. All such instrument control functions may be dedicated locally to the PCR instrument, or computer system 100 of FIG. 1 may provide remote control of part or all of the control, analysis, and reporting functions, as will be discussed in more detail subsequently.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Other Systems and Applications

In various embodiments, the devices, instruments, systems, and methods described herein may be used to detect one or more types of biological components of interest. These biological components of interest may be any suitable biological target including, but are not limited to, DNA sequences (including cell-free DNA), RNA sequences, genes, oligonucleotides, molecules, proteins, biomarkers, cells (e.g., circulating tumor cells), or any other suitable target biomolecule.

In various embodiments, such biological components may be used in conjunction with various PCR, qPCR, and/or dPCR methods and systems in applications such as fetal diagnostics, multiplex dPCR, viral detection and quantification standards, genotyping, sequencing validation, mutation detection, detection of genetically modified organisms, rare allele detection, and copy number variation. Embodiments of the present disclosure are generally directed to devices, instruments, systems, and methods for monitoring or measuring a biological reaction for a large number of small volume samples. As used herein, samples may be referred to as sample volumes, or reactions volumes, for example.

While generally applicable to quantitative polymerase chain reactions (qPCR) where a large number of samples are being processed, it should be recognized that any suitable PCR method may be used in accordance with various embodiments described herein. Suitable PCR methods include, but are not limited to, digital PCR, allele-specific PCR, asymmetric PCR, ligation-mediated PCR, multiplex PCR, nested PCR, qPCR, genome walking, and bridge PCR, for example.

As described below, in accordance with various embodiments described herein, reaction sites may include, but are not limited to, through-holes, wells, indentations, spots, cavities, sample retainment regions, reaction sites, and reaction chambers, for example.

Furthermore, as used herein, thermal cycling may include using a thermal cycler, isothermal amplification, thermal convection, infrared mediated thermal cycling, or helicase dependent amplification, for example. In some embodiments, the chip may be integrated with a built-in heating element.

According to various embodiments, detection of a target may be, but is not limited to, fluorescence detection, detection of positive or negative ions, pH detection, voltage detection, or current detection, alone or in combination, for example.

Figure 3:
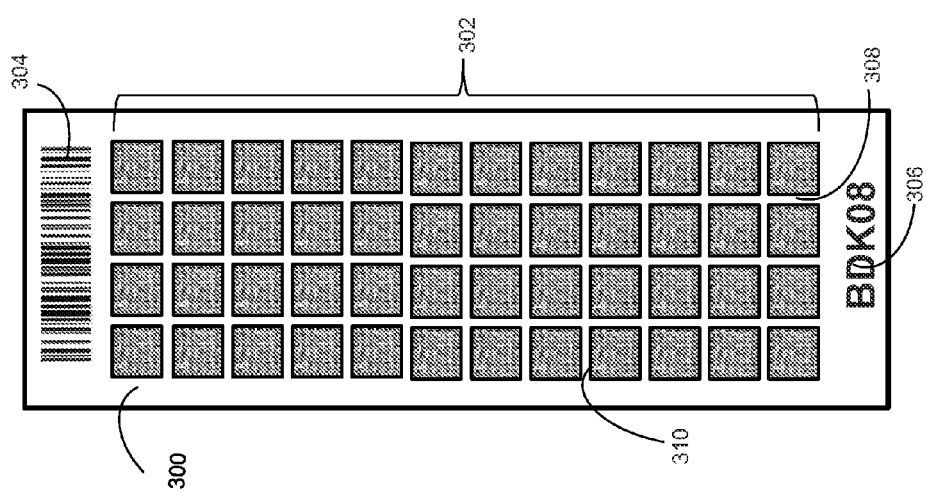
FIG. 3 illustrates a sample chip according to various embodiments described herein.

FIG. 3 illustrates a substrate 300 labeled with two identifiers according to various embodiments. A plurality of samples may be included in the reaction site area 302 for testing on a single substrate 300. The reaction site area 302 is illustrated as an array. In other examples, a reaction site area may include one sample. In some embodiments, a plurality of substrates 300 may be in a system for testing. For example, two, four, or twenty substrates 300 may be put in an instrument system for testing. The assay components may also be preloaded along with the sample in the reaction site area 302 in some embodiments. The reaction site area 302 includes a plurality of subarrays. Between subarrays, septa such as septum 308 and septum 310 may separate the subarrays. Each subarray may include a plurality of individual reaction sites, such as wells or holes. In this example, the substrate has a predetermined pattern of subarrays of reaction sites. It should be recognized that reaction sites may be arranged in a plurality of other patterns. Embodiments described herein utilize predetermined patterns or arrangements of reaction sites.

The machine-readable identifiers in the embodiment shown in FIG. 3 are a barcode 304 and an alphanumeric code 306. However, it should be recognized that the machine-readable identifiers, according to embodiments described in this document, may be barcodes, text, numerals, or other symbols, for example, and any combination thereof. As mentioned above, finding a point of reference according to the embodiments described herein may be a factor in other methods for reading and detecting these identifiers.

Figure 4:
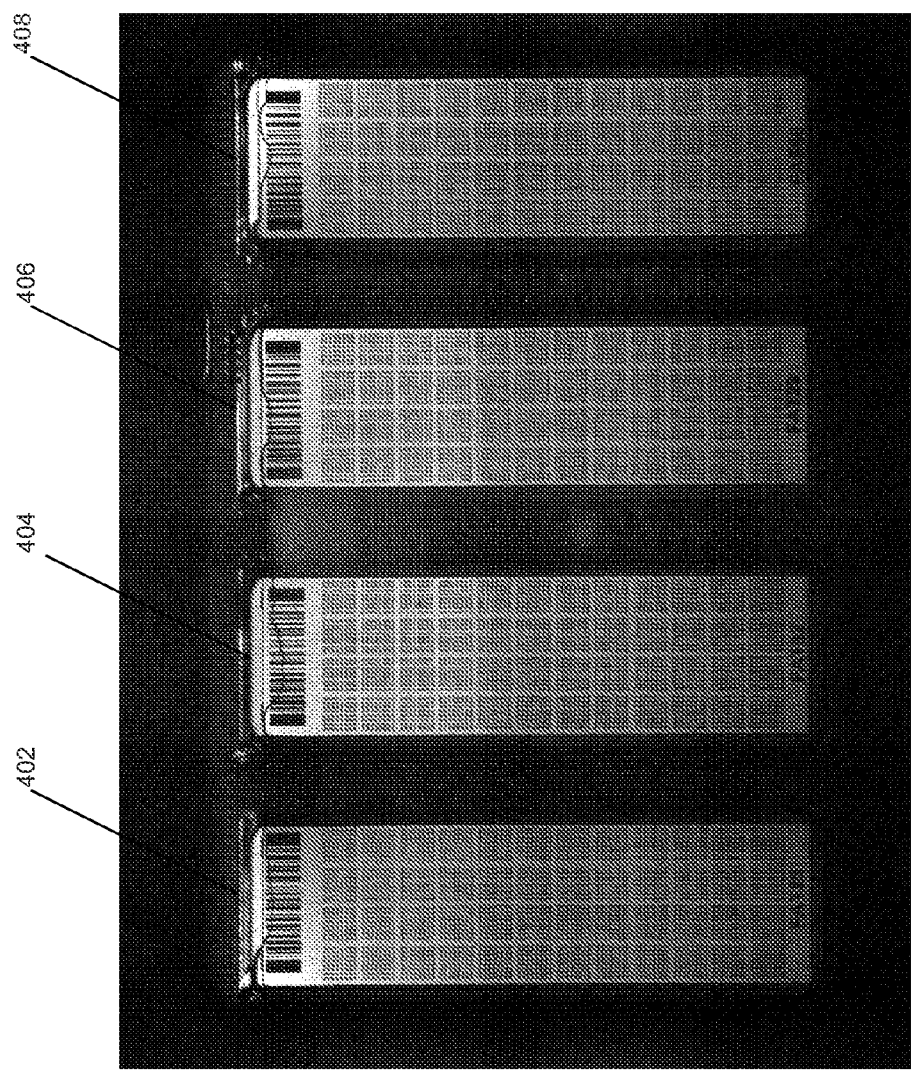
FIG. 4 illustrates an exemplary input image according to various embodiments described herein.

FIG. 4 illustrates an exemplary input image of four sample substrates 402, 404, 406, and 408. According to various embodiments, the image may be a reflected light image or a fluorescent image. Generally, the image data at the center of each substrate may be of better quality than the edges. There may be low and high contrast or distortion around the edges of the substrate and of the image. As such, according to various embodiments, it is useful to determine the center area of a substrate within an image.

Figure 5:
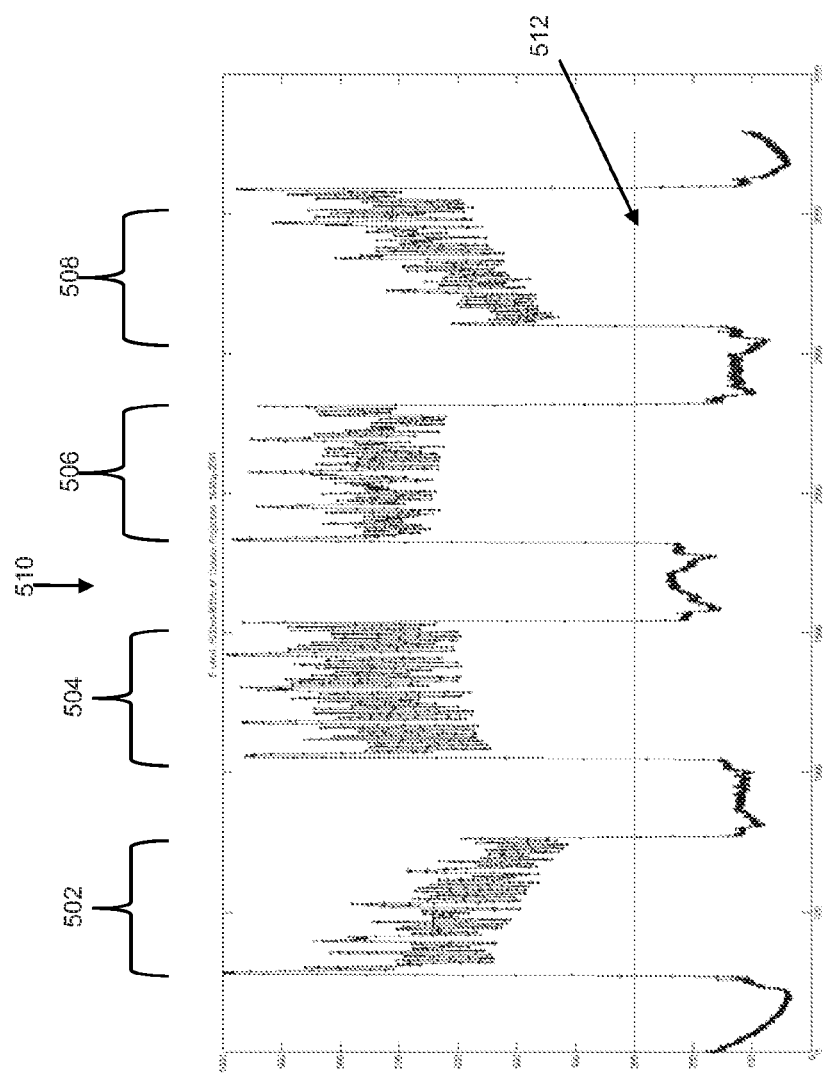
FIG. 5 illustrates an example of a column projection of an input image according to various embodiments described herein.

FIG. 5 illustrates a column projection of the exemplary image shown in FIG. 4. The y-axis represents a gray level measure. A projection, according to various embodiments, means a sum over all the pixel gray level values along a given straight line. In other words, for each column of pixels, a path integral is taken. Similarly, a row projection means summing over all pixels along the rows of an image. According to embodiments described herein, projections are used to extract features in particular directions for further analysis. It should also be recognized that projections can be taken in other paths and dimensions besides rows and columns to facilitate pattern determination according to various embodiments. For example, a projection of a surface may be determined by taking projections in two-dimensions to generate a two-dimensional projection that can be subtracted from a surface. In other examples, projections may be taken in several other dimensions based in part upon the pattern of the features and/or the desired geometry of the area needing pedestal removal.

For example, column projection 510 in FIG. 5 shows the path integral, or the sum of gray levels of each column of pixels, within the exemplary image of FIG. 4. Furthermore, the path integral is normalized to a maximum value of 1000 or other convenient value.

From column projection 510, it can be determined that four substrates 502, 504, 506, and 508 are present in the image. This may be done by setting a threshold 512 at a certain level. If the column projection 510 crosses threshold 512, it can be determined that that is an edge of a substrate. Furthermore, for example, if it is known that the system should include four substrates, it can be expected that the column projection 510 will cross threshold 512 eight times (two edges for each of the four substrates). Thus, in column projection 510, four substrates 502, 504, 506, and 508 are detected. According to various embodiments, in this way, it can be checked whether the expected number of substrates in the system are present. In the example illustrated in FIG. 5, four sample substrates are expected and detected. Furthermore, the known spacing between a plurality of substrates may be used to determine a reasonable expected size and position of the detected substrate for discriminating foreign and or defective objects. As mentioned above, projection data generated at different orientations can be used to detect substrates with different orientations.

Figure 6:
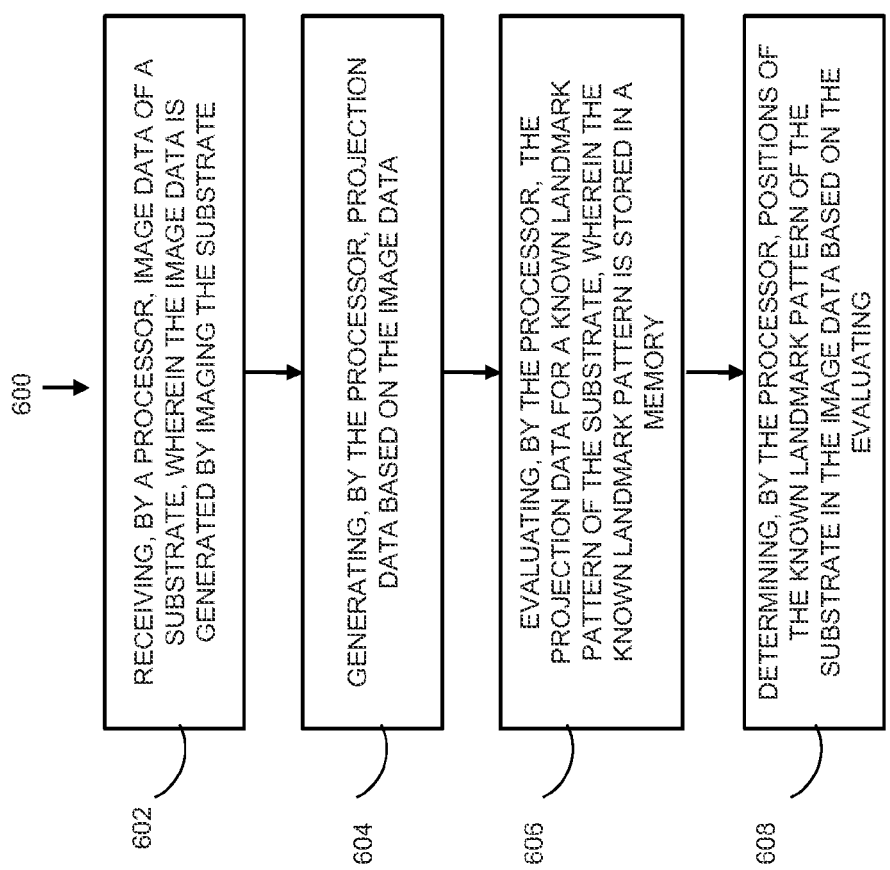
FIG. 6 is a flowchart illustrating an exemplary method according to various embodiments described herein.

FIG. 6 is a flowchart showing an exemplary method 600 of finding a position of a substrate within an image according to various embodiments. In step 602, a processor receives image data of a substrate. The image data may be generated when the substrate is imaged by optical system 224 (FIG. 2), for example. In step 604, the processor generates projection data from the image data. The projection data may be generated by calculating the sum of gray level measures along a path. In step 606, the processor evaluates the projection data based on information known about the substrate, such as an expected pattern of landmarks. In various embodiments, the pattern of landmarks may be septa separating subarrays. Since the septa should be a certain number of pixels apart (at a certain pixel width), according to the dimensions of the substrate, the system may search for the next septa at the expected location, and check the width of the detected septa as needed. As such, in step 608, the positions of the landmarks are determined within the image.

Figure 7A:
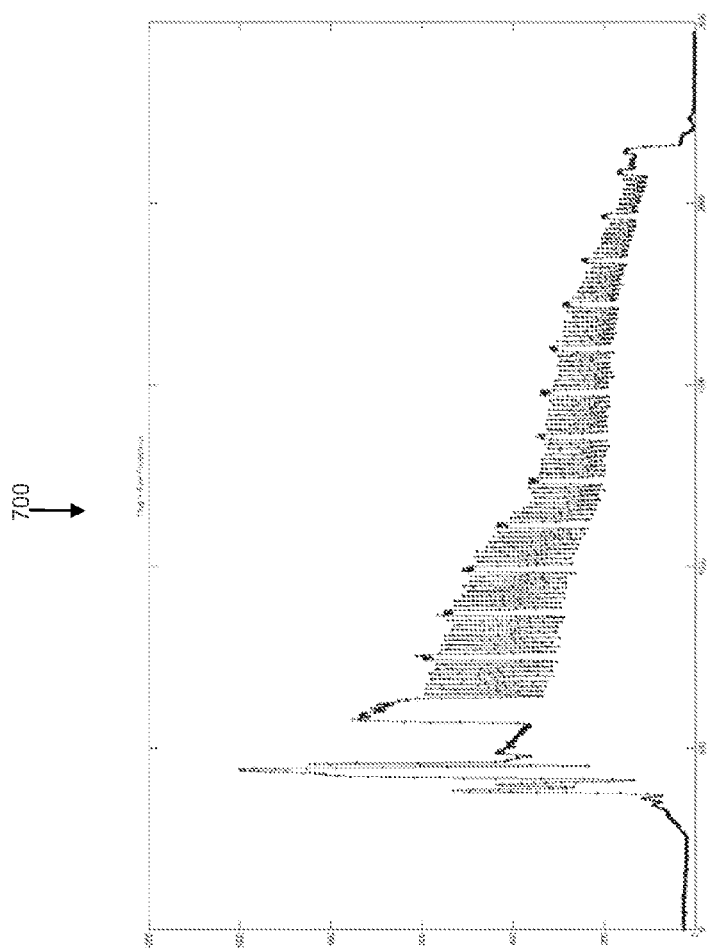
FIG. 7A illustrates an example of a row projection of an input image according to various embodiments described herein.

In FIG. 7A, a row projection 700 of a single substrate is shown according to various embodiments described herein.

Figure 7B:
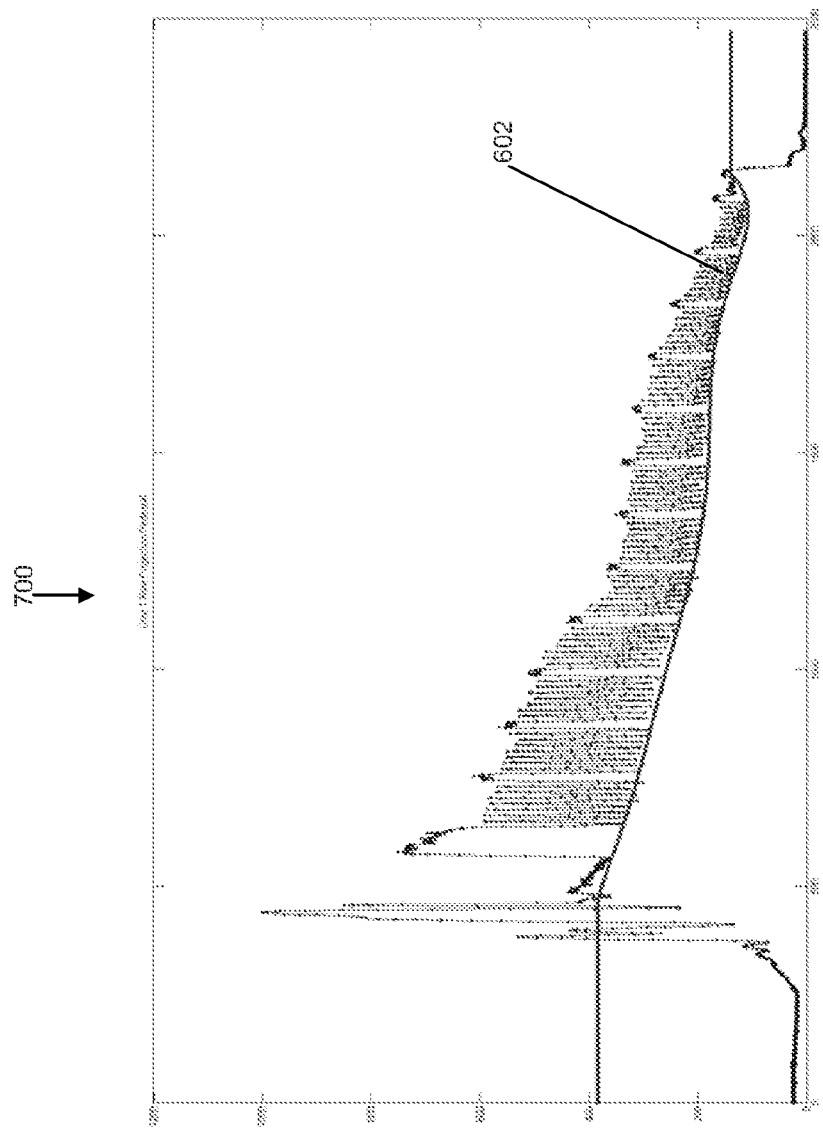
FIG. 7B illustrates an example of a pedestal baseline of the row projection of FIG. 7A according to various embodiments described herein.

FIG. 7B depicts row projection 700 and a determined pedestal 702. In this document, a pedestal contains information that is unneeded, may be harmful, and may complicate further processing, according to various embodiments. A pedestal may be caused by optical scatter noise and optical non-uniformity.

A pedestal may be determined by several methods in accordance with various embodiments. For example, local minimum values may be determined across the projection, and a curve may be fitted to these minimum values. The positions for determining local minimum values may be determined on a known pattern of the substrate. For example, with reference to FIG. 4, it is known one substrate 402 will have subarray dimensions of 4×12 subarrays. As such, in a row projection, such as in FIG. 7B, a pattern corresponding to the twelve expected subarrays will be looked for. Additionally, the fitted curve may be adjusted based on a check between the minimum values and the determined fitted curve.

As another example of pedestal determination, the pedestal includes the bottom envelope of a projection excluding the estimated border regions. The border of the bottom envelope may be fit to a polynomial curve of seven degrees or another appropriate degree, for example. The polynomial curve is then adjusted to the minimum values of the projection at locations where the minimum values of the projection is less than the polynomial curve to form a new bottom envelope. This new bottom envelope is then fitted with another seven degree polynomial. The polynomial coefficients are used to calculate the pedestal by evaluating the polynomial values at all data sample locations between the estimated border region of the reaction site area of the substrate. Beyond the border region, the pedestal is padded with constant values based on the end point values of the polynomial curve to obtain the final pedestal baseline. The pedestal is removed by subtracting the pedestal baseline to remove the pedestal from the projection curve, and data beyond the borders are set to zero.

Figure 7C:
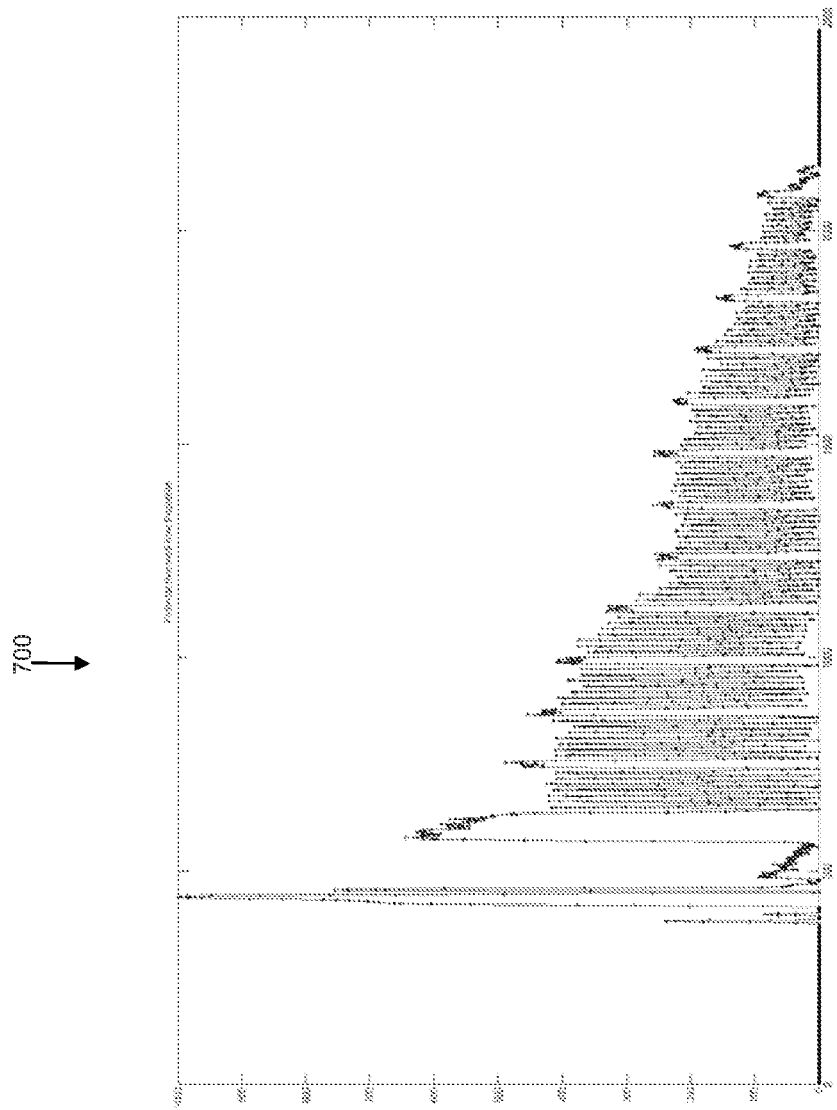
FIG. 7C illustrates the exemplary row projection of FIG. 6A with the pedestal removed according to various embodiments described herein.

FIG. 7C illustrates row projection 700 with pedestal 702 removed. It is removed by subtracting the determined pedestal 702 from row projection 700. In this way, noise from optical distortion is lessened and subsequent processing may be simpler. For example, by removing the pedestal, suitable local thresholding methods to find septa, other landmarks, or individual reaction sites may be used to analyze the image data. These methods include, but are not limited to, Otsu, averaging, and median thresholding methods.

Figure 8:
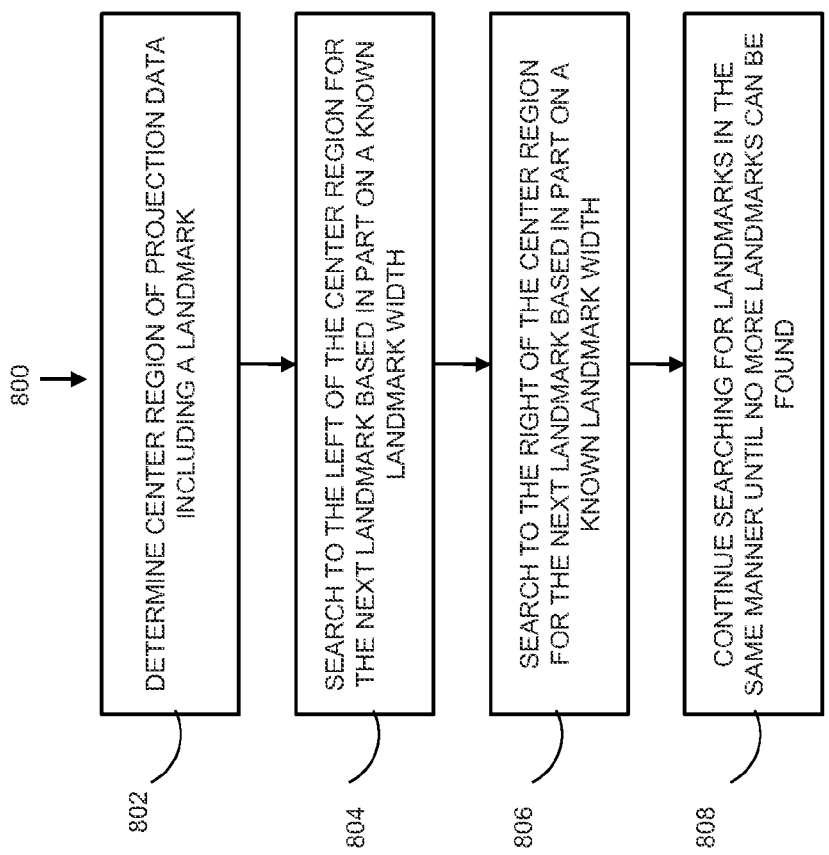
FIG. 8 is a flowchart illustrating an exemplary method according to various embodiments described herein.

Since the pattern of the landmarks of a substrate is known, it can be determined what portions of the image correspond to this expected pattern. FIG. 8 illustrates an exemplary method 800 according to various embodiments for determining the landmarks of a substrate. As mentioned previously, the center region of a substrate is likely to have better quality image data. In order to determine where all the expected landmarks, such as septa, are located, the data can be analyzed starting at the expected center region. The center region in the projection data is determined in step 802. The center region is searched for the basic motif of the substrate, in this case eight individual reaction sites between two bordering septa of relative larger width and higher image pixel vales. This step provides the measurement features of the substrate such as pitch of the individual reaction sites and the pitch of the septa. By searching to the left and right of the expected center location, the other septa can be located. It may also be known, and stored in memory, the number of pixels that correspond to the expected septa width. For example, the expected septa width may be 20 pixels in some embodiments.

In steps 804 and 806, the regions to the left and right of the center region are examined for other septa. The processor continues to the left and right until the expected number of septa are found, or no other landmarks, or septa, are found as in step 808.

Figure 7D:
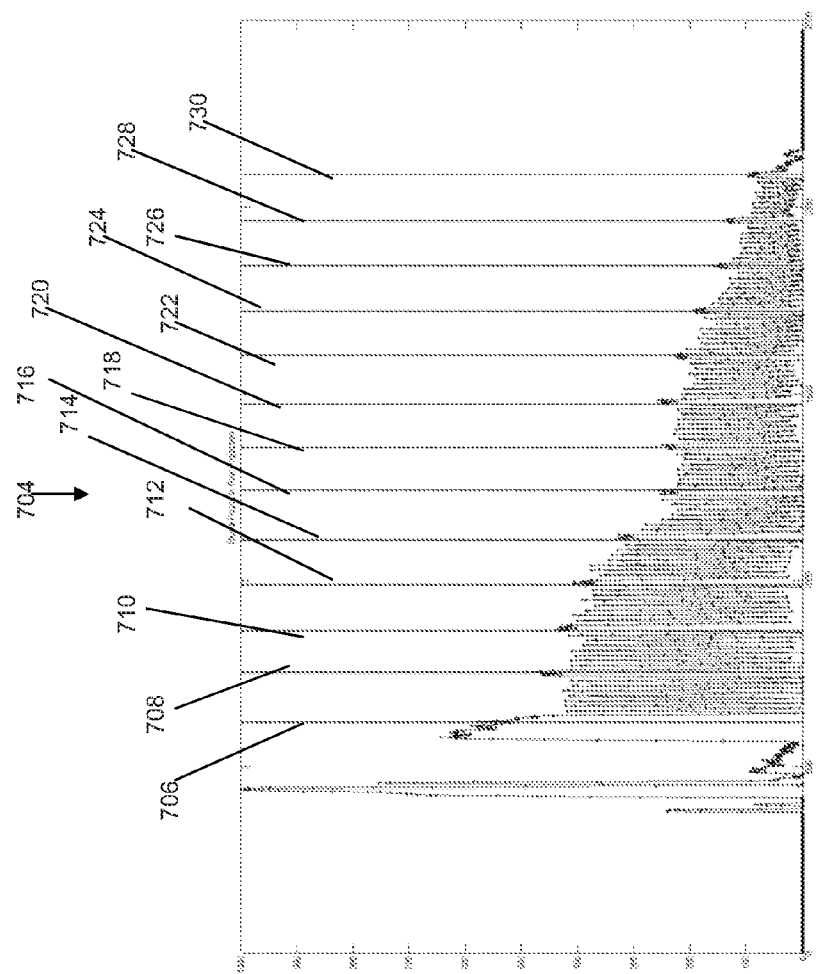
FIG. 7D illustrates the exemplary row projection of FIG. 6A and determined landmarks according to various embodiments described herein'

For example, with reference to FIG. 7D, septum 718 may be detected initially. From there, the processor may step to the left until the next septum 716 is detected. In various embodiments, the search is based on the expected septa width. Continuing, the processor may search for the next septa to the right of septum 718, septum 720. This process may continue until the expected number of septa is found or no further septum is found.

Figure 9:
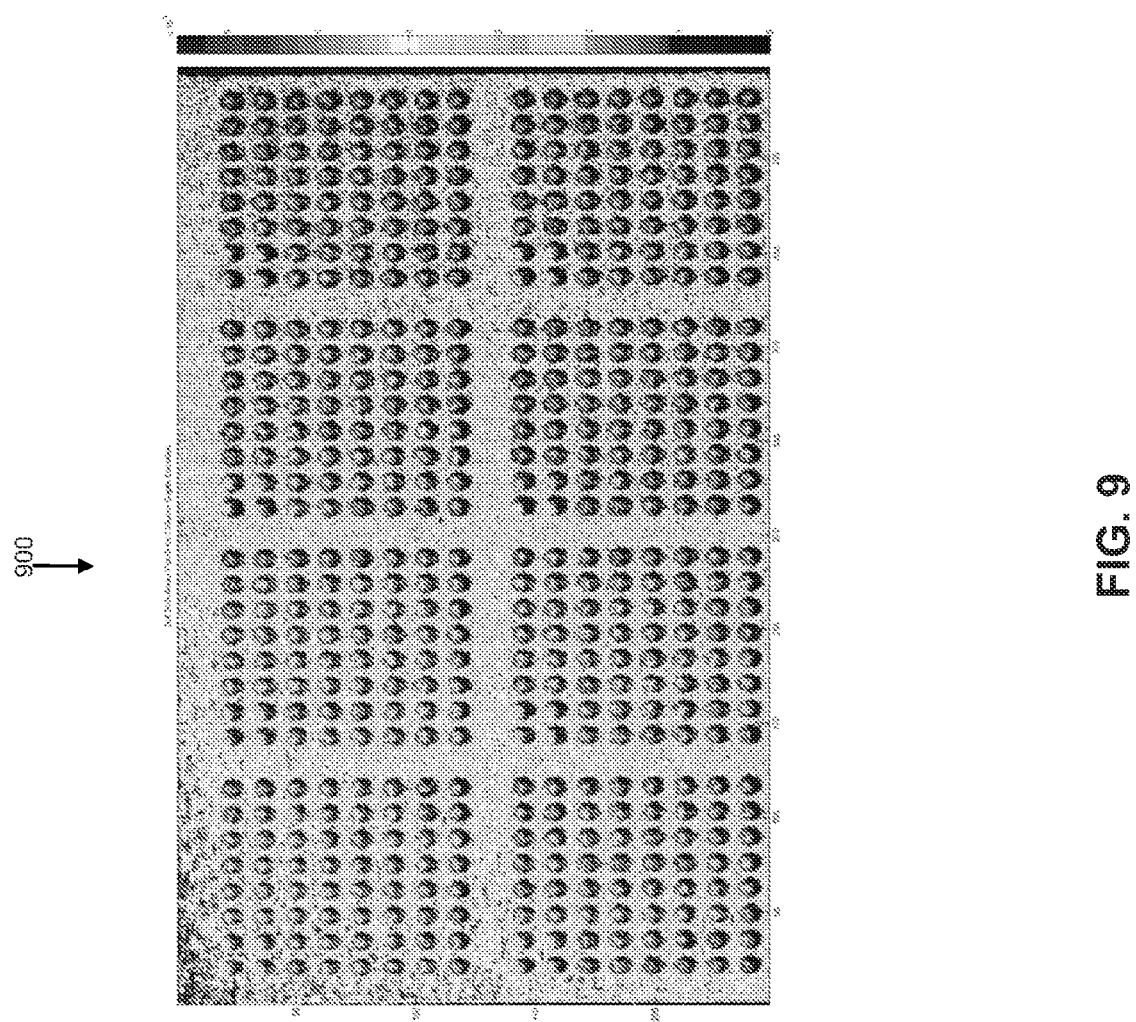
FIG. 9 illustrates another exemplary input image according to various embodiments described herein.

FIG. 9 depicts a 2×4 subarray image portion of a substrate. By examining a smaller portion of an image, the optical distortion and the effect of a tilted substrate may be minimized, for example. As mentioned above, generally, the image of the center region of a substrate is a better quality image. As such, the 2×4 subarray image portion in FIG. 9 may be taken from the center region of a substrate image.

Figure 10A:
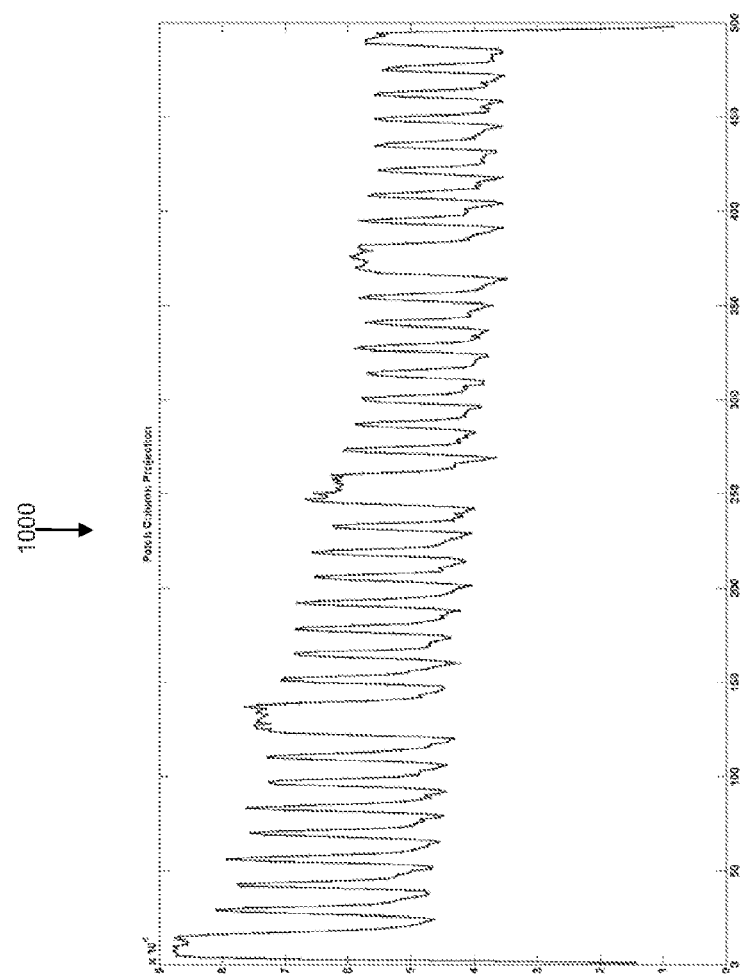
FIG. 10A illustrates another exemplary column projection according to various embodiments described herein.
Figure 10B:
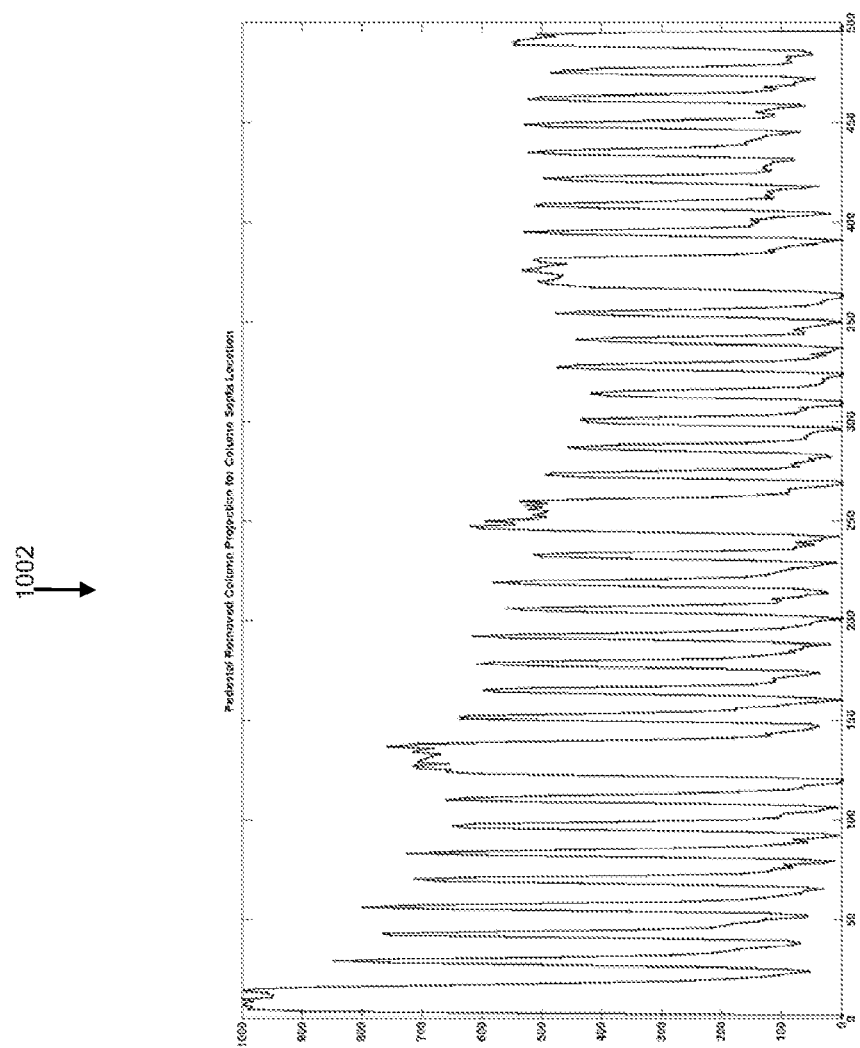
FIG. 10B illustrates the exemplary column projection of FIG. 10A with the pedestal removed according to various embodiments described herein.

FIG. 10A illustrates a column projection 1000 over the 2×4 subarray image portion of FIG. 7. Similar to the row projection example described above with reference to FIGS. 7A-7D, the pedestal may be computed and removed from column projection 1000 to remove unneeded and potential harmful data. FIG. 10B illustrates column projection 1000 with the pedestal removed.

Figure 10C:
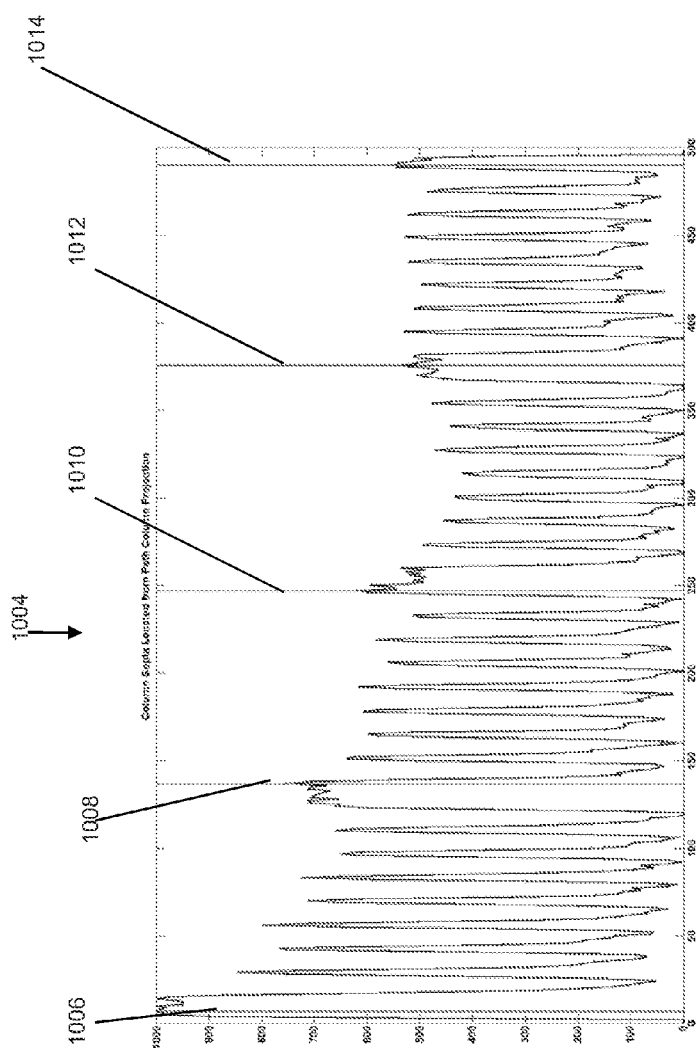
FIG. 10C illustrates determined column landmarks based on the exemplary column projection of FIG. 10A according to various embodiments described herein.

Furthermore, as illustrated in FIG. 10C, in a similar manner as described above, the column septa may be detected. Here, four subarrays are detected by finding the five septa 1006, 1008, 1010, 1012, and 1014 that separate the subarrays.

After the processor is able to determine the septa grid from the column and row projections, a point of reference may be determined on the image. According to various embodiments, the point of reference that may be determined is the center of each substrate. The determined point of reference may then be used by subsequent algorithms or calculations by the processor. In other embodiments, the center of substrate in the image may be indicated to a user on a display screen. According to various embodiments described herein, the center of the septa grid is returned as the substrate center.

Figure 11:
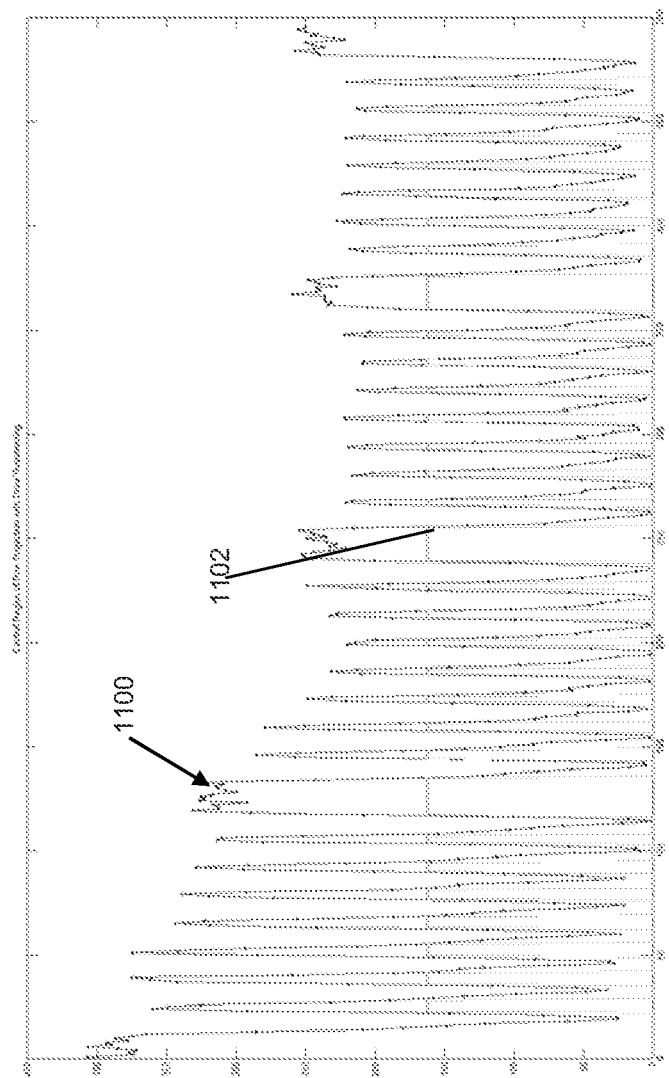
FIG. 11 illustrates an exemplary septa grid image according to various embodiments described herein.

Furthermore, in a similar method, each individual reaction site, such as an individual well or hole, may be detected according to various embodiments described herein. First, a projection curve may be compared with a threshold. For example, in FIG. 11, the projection curve 1100 may be compared to a predetermined threshold so that data above the threshold becomes the threshold value and data below the threshold becomes zero. This is based on an Otsu thresholding method. However, it should be recognized that other thresholding methods may be used.

Figure 12:
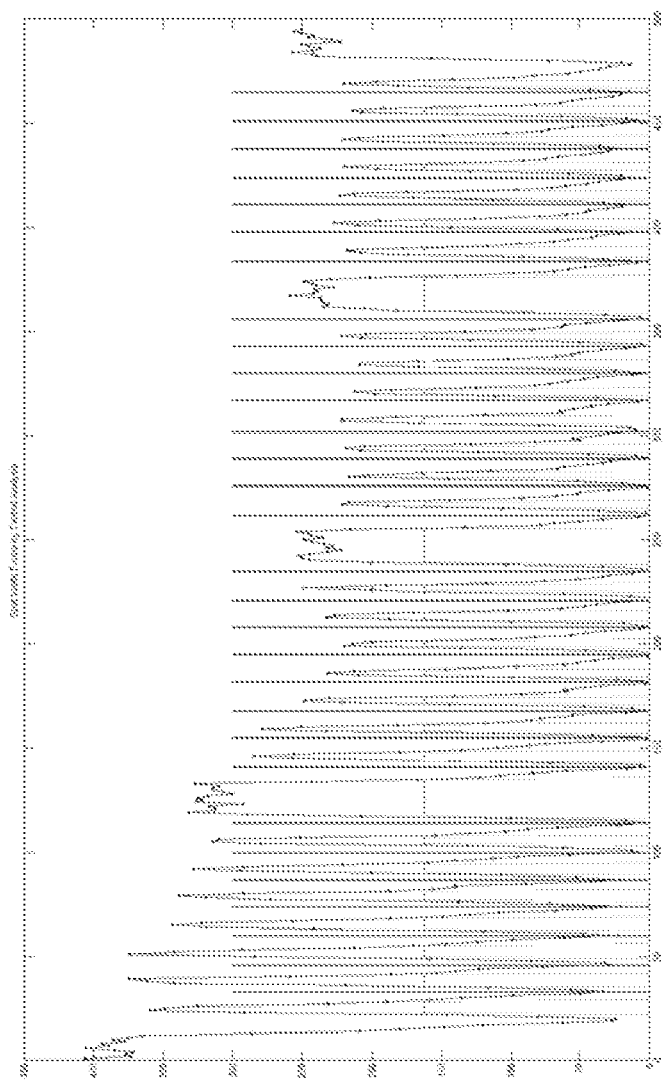
FIG. 12 illustrates the exemplary column projection, threshold, and determined sample holes according to various embodiments described herein.

In this way, every region that is zero, it can be determined that an individual reaction site may be found, as depicted in FIG. 12.

The analysis is based on adaptive Otsu thresholding of a small region of the projection, septa are identified by the width of the well spacings and the known number of spot wells between adjacent septa. Spot well is also called "pod" in the code.

Figure 13:
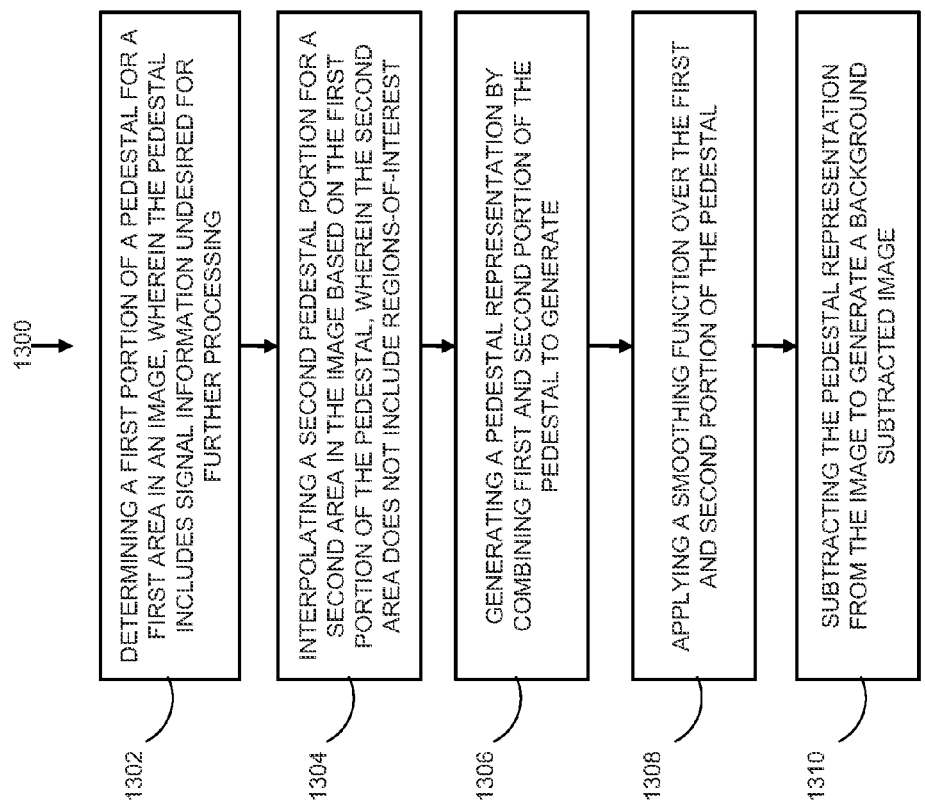
FIG. 13 is a flowchart illustrating an exemplary method for removing a pedestal from an image according to various embodiments described herein.
Figure 14:
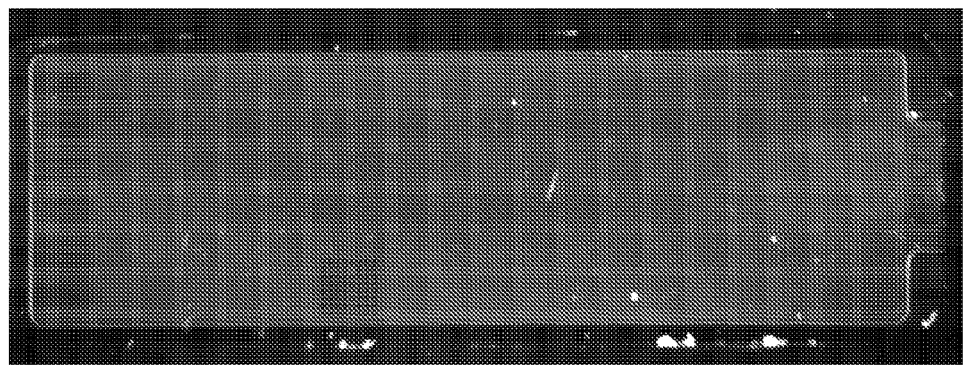
FIG. 14 illustrates an exemplary image according to various embodiments described herein.

According to various embodiments described herein, a pedestal may be calculated from the image data by the method illustrated in the flowchart of FIG. 13. An exemplary image of a single substrate is illustrated in FIG. 14. As can be seen in FIG. 14, particles of dust and scratches on the case enclosing the substrate are included in the image and create background noise, or undesired data.

As mentioned above, in various embodiments a pedestal may be calculated for a two-dimensional surface for a more accurate reaction site location determination. A two-dimensional pedestal is used to remove the slowing varying dynamic background due to scatter, chemical agent emission cross talk, excitation light cross talk. Each subarray (a unit of a predetermined pattern) is isolated and the border of adjacent reaction sites. A portion including the subarray may be calculated and data samples along the portion borders are used to fill in the area within the portion. Gaps are filled between other portions, each portion enclosing a subarray, and the pedestal is smoothed. The final result is used for pedestal removal. According to the exemplary method, in step 1302, the subarrays, and then the locations of the reaction sites are determined according to the methods described above. However, it should be recognized that other embodiments may include other configurations and geometries of the substrate analyzed in the image that may or may not include subarrays. After determining the locations of the subarrays, the pedestal, as described above, is generated to produce a two-dimensional pedestal representation. In other examples, the subarrays may be in a hexagonal shape, which may require pedestal determinations in six-dimensions.

Figure 15A:
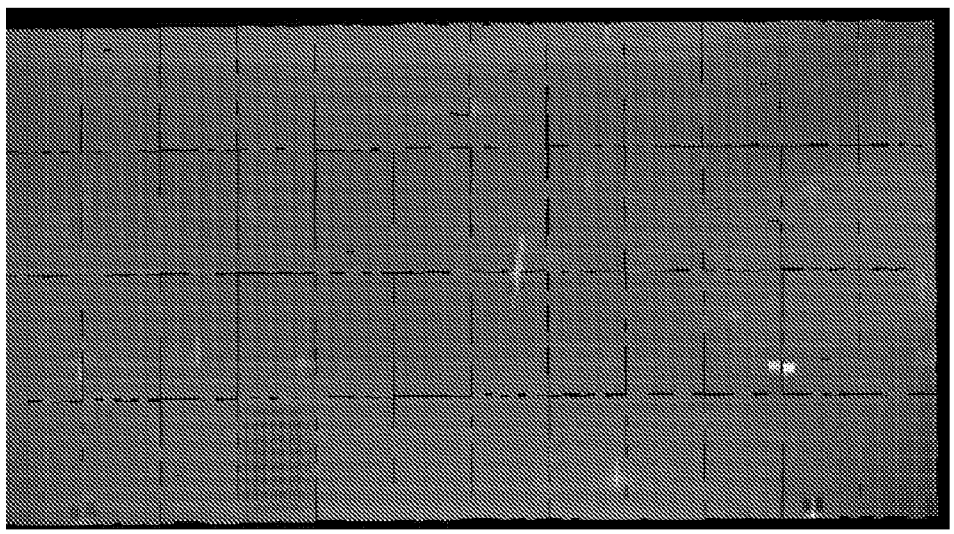
FIG. 15A illustrates an exemplary representation of a pedestal determined from the image of FIG. 14 according to various embodiments described herein.
Figure 15B:
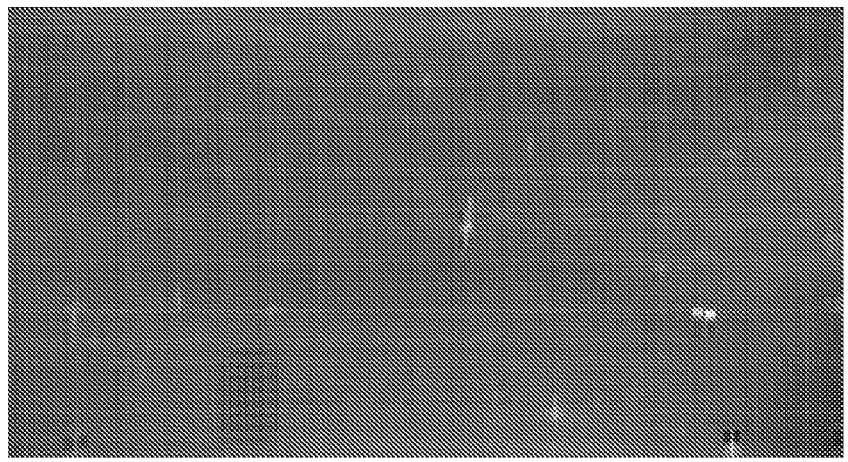
FIG. 15B illustrates a further exemplary representation of the pedestal as in FIG. 15A including interpolated data for the septa between the subarrays.

The pedestal representation data for each subarray is determined and is illustrated in FIG. 15A. The gaps between subarrays were excluded from the pedestal determinations for each subarray because the image data of the septa of the substrate is data that is not needed to determine the data for the sample volumes included in the subarrays. Thus, in step 1304, the pedestal generation of the entire substrate is further processed to smooth the areas between the subarrays. In other words, using the pedestal determinations for each subarray, the data of the gaps between each subarray is interpolated. Interpolation may be implemented with a linear interpolation function, in some examples. This modified pedestal representation with the interpolated areas between each subarray pedestal determination is shown in FIG. 15B.

Figure 15C:
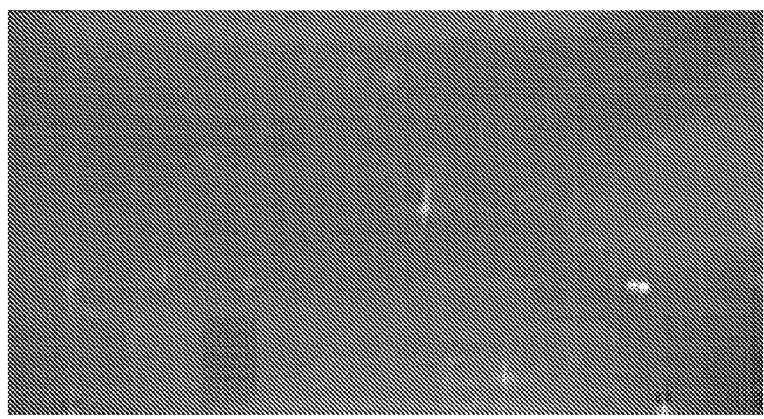
FIG. 15C illustrates yet another exemplary representation of the pedestal in FIG. 15B including smoothed data over the entire surface of the substrate

With reference back to method 1300, in step 1308, the data of the entire surface of the pedestal representation is smoothed to further remove noise. Smoothing may be a rectangular, Hann, Kaiser-Bessel, Hamming, Gaussian, or Harris windows, for example. This smoothed pedestal representation is shown in FIG. 15C.

Figure 16:
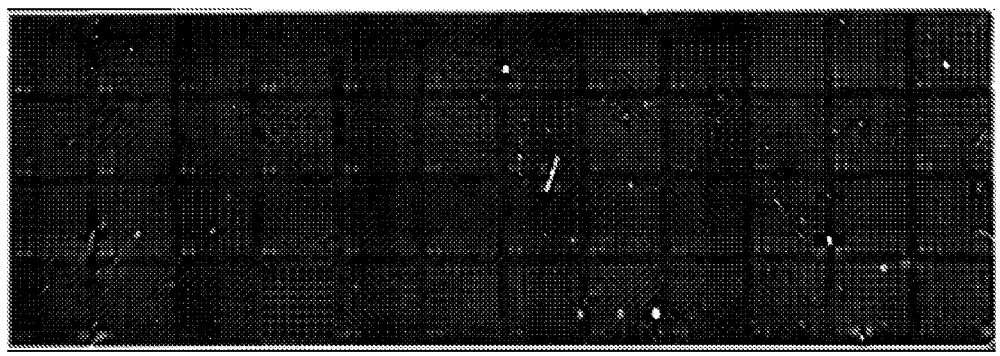
FIG. 16 illustrates an exemplary processed image with the pedestal removed according to various embodiments described herein.

In step 1310, the pedestal representation of the image may is subtracted from the original image (FIG. 14) to produce a background subtracted image as shown in FIG. 16.

In various embodiments described, after the vicinity of all of the locations of the reaction sites are determined, the locations of each reaction site can be fine tuned by fitting a second order polynomial to a row or column of reaction sites. This second order curve can further determine a more accurate location for each of the reaction sites. According to various embodiments, in this way, the effect of optical distortions resulting from foreign objects like dirt and dust, for example, are minimized.

Therefore, according to the above, some examples of the disclosure comprise the following:

In one example, a method for improving image quality is provided. The method comprises: receiving image data of a substrate, wherein the image data is generated by imaging the substrate, and an image is generated from the image data; generating a background representation from a background noise portion of the image, wherein the background portion includes signal information undesired for further processing; generating a background subtracted image by subtracting the background representation from the image.

Additionally or alternatively, in one or more of the examples disclosed above, the substrate includes a plurality of regions-of-interest.

Additionally or alternatively, in one or more of the examples disclosed above, the plurality of regions-of-interest is a plurality of reaction sites.

Additionally or alternatively, in one or more of the examples disclosed above, the background portion comprises a first background portion and a second background portion.

Additionally or alternatively, in one or more of the examples disclosed above, the first background portion is determined from a first area in an image.

Additionally or alternatively, in one or more of the examples disclosed above, the second background portion is interpolated from a second area in the image based on the first background portion, wherein the second area does not include regions-of-interest;

In another example, a computer-implemented method of determining a position of a substrate is provided. The method comprises: receiving, by a processor, image data of a substrate, wherein the image data is generated by imaging the substrate; generating, by the processor, projection data based on the image data; evaluating, by the processor, the projection data for a known landmark pattern of the substrate, wherein the known landmark pattern is stored in a memory; and determining, by the processor, positions of the known landmark pattern of the substrate in the image data based on the evaluating.

Additionally or alternatively, in one or more of the examples disclosed above, the method further comprises: determining, by the processor, a center of the substrate based on the determined positions of the known landmark pattern of the substrate.

Additionally or alternatively, in one or more of the examples disclosed above, the method further comprises: determining a pedestal based on the projection data, wherein the pedestal includes signal information undesired for further processing; and processing image data to remove the pedestal.

Additionally or alternatively, in one or more of the examples disclosed above, generating the projection data includes computing a path integral.

Additionally or alternatively, in one or more of the examples disclosed above, generating the projection data includes computing a path integral over columns and rows of the image data based on gray level measures.

Additionally or alternatively, in one or more of the examples disclosed above, the known landmark pattern includes septa between reaction site areas of the substrate.

Additionally or alternatively, in one or more of the examples disclosed above, the method further comprises: determining, by the processor, at least one identifier on the substrate based on the determined positions.

Additionally or alternatively, in one or more of the examples disclosed above, determining the identifier includes analyzing the image data based on the determined positions and expected position of the identifier on the substrate, wherein the expected position is stored in the memory.

In another example, a computer-readable storage medium encoded with instructions, executable by a processor, is provided. The instructions comprise instructions for: receiving image data of a substrate, wherein the image data is generated by imaging the substrate; generating projection data based on the image data; evaluating the projection data for a known landmark pattern of the substrate, wherein the known landmark pattern is stored in a memory; and determining positions of the known landmark pattern of the substrate in the image data based on the evaluating.

Additionally or alternatively, in one or more of the examples disclosed above, the instructions further include instructions for: determining, by the processor, a center of the substrate based on the determined positions of the known landmark pattern of the substrate.

Additionally or alternatively, in one or more of the examples disclosed above, the instructions further include instructions for: determining a pedestal based on the projection data, wherein the pedestal includes signal information undesired for further processing; and processing image data to remove the pedestal.

Additionally or alternatively, in one or more of the examples disclosed above, generating the projection data includes computing a path integral.

Additionally or alternatively, in one or more of the examples disclosed above, generating the projection data includes computing a path integral over columns and rows of the image data based on gray level measures.

Additionally or alternatively, in one or more of the examples disclosed above, the known landmark pattern includes septa between reaction site areas of the substrate.

Additionally or alternatively, in one or more of the examples disclosed above, the instructions further include instructions for: determining, by the processor, at least one identifier on the substrate based on the determined positions.

Additionally or alternatively, in one or more of the examples disclosed above, determining the identifier includes analyzing the image data based on the determined positions and expected position of the identifier on the substrate, wherein the expected position is stored in the memory.

In another example, a system for visualizing a plurality of data plots is provided. The system comprises: a processor; and a memory encoded with instructions for: receiving image data of a substrate, wherein the image data is generated by imaging the substrate; generating projection data based on the image data; evaluating the projection data for a known landmark pattern of the substrate, wherein the known landmark pattern is stored in the memory; and determining positions of the known landmark pattern of the substrate in the image data based on the evaluating.

Additionally or alternatively, in one or more of the examples disclosed above, the memory is encoded with instructions for: determining, by the processor, a center of the substrate based on the determined positions of the known landmark pattern of the substrate.

Additionally or alternatively, in one or more of the examples disclosed above, the memory is encoded with instructions for: determining a pedestal based on the projection data, wherein the pedestal includes signal information undesired for further processing; and processing image data to remove the pedestal.

Additionally or alternatively, in one or more of the examples disclosed above, the memory is encoded with instructions for: determining, by the processor, at least one identifier on the substrate based on the determined positions.

In another example, a method for improving image quality is provided. The method comprises: determining a first portion of a pedestal for a first area in an image, wherein the pedestal includes signal information undesired for further processing; interpolating a second pedestal portion for a second area in the image based on the first portion of the pedestal, wherein the second area does not include regions-of-interest; generating a pedestal representation by combining first and second portion of the pedestal; applying a smoothing function over the first and second portion of the pedestal; and subtracting the pedestal representation from the image to generate a background subtracted image.

Additionally or alternatively, in one or more of the examples disclosed above, determining the pedestal for the first area of the image includes evaluating projection data of the first area in at least two dimensions.

Additionally or alternatively, in one or more of the examples disclosed above, the first area is determined based on a predetermined pattern of areas.

Although the present invention has been described with respect to certain exemplary embodiments, examples, and applications, it will be apparent to those skilled in the art that various modifications and changes may be made without departing from the invention.

What is claimed is:

1. A computer-implemented method of determining a position of a substrate, the method comprising:
   receiving, by a processor, image data of a substrate, wherein the image data is generated by imaging the substrate;
   generating, by the processor, projection data based on the image data;
   evaluating, by the processor, the projection data for a known landmark pattern of the substrate, wherein the known landmark pattern is stored in a memory;
   determining, by the processor, positions of the known landmark pattern of the substrate in the image data based on the evaluating;
   determining a pedestal based on the projection data, wherein the pedestal baseline is determined by fitting a curve to local minimum values of the projection data; and
   processing image data to remove the pedestal, wherein the pedestal is removed by subtracting the pedestal baseline to remove the pedestal from the projection curve.

2. The computer-implemented method of claim 1, further comprising:
   determining, by the processor, a center of the substrate based on the determined positions of the known landmark pattern of the substrate.

3. The computer-implemented method of claim 1, wherein generating the projection data includes computing a path integral.

4. The computer-implemented method of claim 1, wherein generating the projection data includes computing a path integral over columns and rows of the image data based on gray level measures.

5. The computer-implemented method of claim 1, wherein the known landmark pattern includes septa between reaction site areas of the substrate.

6. The computer-implemented method of claim 1, further comprising:
   determining, by the processor, at least one identifier on the substrate based on the determined positions.

7. The computer-implemented method of claim 6, wherein determining the identifier includes analyzing the image data based on the determined positions and expected position of the identifier on the substrate, wherein the expected position is stored in the memory.

8. A non-transitory computer-readable storage medium encoded with instructions, executable by a processor, the instructions comprising instructions for:

receiving image data of a substrate, wherein the image data is generated by imaging the substrate;

generating projection data based on the image data;

evaluating the projection data for a known landmark pattern of the substrate, wherein the known landmark pattern is stored in a memory; and determining positions of the known landmark pattern of the substrate in the image data based on the evaluating;

determining a pedestal based on the projection data, wherein the pedestal baseline is determined by fitting a curve to local minimum values of the projection data; and processing image data to remove the pedestal, wherein the pedestal is removed by subtracting the pedestal baseline to remove the pedestal from the projection curve.

9. The non-transitory computer-readable storage medium of claim 8, wherein the instructions further include instructions for:

determining, by the processor, a center of the substrate based on the determined positions of the known landmark pattern of the substrate.

10. The non-transitory computer-readable storage medium of claim 8, wherein generating the projection data includes computing a path integral.

11. The non-transitory computer-readable storage medium of claim 8, wherein generating the projection data includes computing a path integral over columns and rows of the image data based on gray level measures.

12. The non-transitory computer-readable storage medium of claim 8, wherein the known landmark pattern includes septa between reaction site areas of the substrate.

13. The non-transitory computer-readable storage medium of claim 8, wherein the instructions further include instructions for:

determining, by the processor, at least one identifier on the substrate based on the determined positions.

14. The non-transitory computer-readable storage medium of claim 13, wherein determining the identifier includes analyzing the image data based on the determined positions and expected position of the identifier on the substrate, wherein the expected position is stored in the memory.

15. A system for visualizing a plurality of data plots, the system comprising:

a processor; and a memory encoded with instructions for:

receiving image data of a substrate, wherein the image data is generated by imaging the substrate;

generating projection data based on the image data;

evaluating the projection data for a known landmark pattern of the substrate, wherein the known landmark pattern is stored in the memory;

determining positions of the known landmark pattern of the substrate in the image data based on the evaluating;

determining a pedestal based on the projection data, wherein the pedestal baseline is determined by fitting a curve to local minimum values of the projection data; and processing image data to remove the pedestal, wherein the pedestal is removed by subtracting the pedestal baseline to remove the pedestal from the projection curve.

16. The system of claim 15, wherein the memory is encoded with instructions for:

determining, by the processor, a center of the substrate based on the determined positions of the known landmark pattern of the substrate.

17. The system of claim 15, wherein the memory is encoded with instructions for:

determining, by the processor, at least one identifier on the substrate based on the determined positions.

* * * * *